Figure 1:
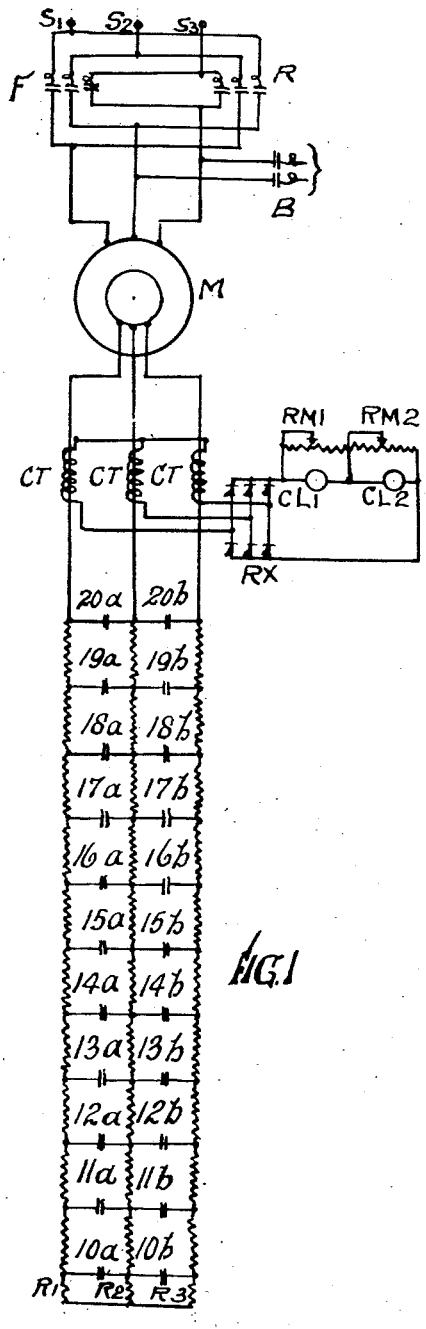

Sept. 3, 1957 O. T. EVANS ET AL 2,805,376
CONTROL ARRANGEMENTS FOR BRAKING ALTERNATING
CURRENT INDUCTION MOTORS
Filed Oct. 23, 1953 2 Sheets-Sheet 1

INVENTORS
Owen Thomas Evans
Richard Hathaway
Leo Abram

By Kearns & Bateman
ATTORNEYS

United States Patent Office 2,805,376
Patented Sept. 3, 1957

2,805,376

CONTROL ARRANGEMENTS FOR BRAKING ALTERNATING CURRENT INDUCTION MOTORS

Owen Thomas Evans, Sale, Richard Hathaway, Swinton, and Leo Abram, Sale, England, assignors to Metropolitan-Vickers Electrical Company Limited, London, England, a British company Application October 23, 1953, Serial No. 387,898

Claims priority, application Great Britain October 23, 1952

8 Claims. (Cl. 318—212)

This invention relates to the control of electrically operated hoists, winders, and the like, driven by alternating current induction motors.

The invention has important application in such motors with provision for dynamic braking, that is to say in which for retarding the load one winding, usually the stator winding, is connected with an exciter or other direct current source whilst the circuit of the other winding, usually a slip ring rotor winding, is closed through variable load resistance, said resistance conveniently but not essentially being that employed for controlling the torque during motoring. The invention, moreover, is particularly but not exclusively concerned with the control of dynamic braking in systems of the kind in which the load resistance is of solid metallic form instead of being a liquid controller, and the value of load resistance is regulated by operation of the driver's control lever to control the braking torque.

It is well known that in dynamic braking systems with constant excitation of the motor the value of load resistance must be changed with change in speed of the motor and that if at any given speed the load resistance is reduced below a certain value unstable conditions will result and cause braking torque to be lost, that is to say, it is possible for the driver to reduce the resistance to a value at which instead of increasing the rotor current and braking torque said current and torque will in fact fall.

According to the present invention an alternating current induction motor having wound rotor and stator members employed in a winder, hoist or the like equipment, has means for connecting the winding of one of its members with a source of direct current for dynamically braking the motor, and the winding of the other of its members is provided with control means in which loading resistance is arranged which comprises a plurality of resistance sections adapted to be inserted or removed under manual or other control of the driver such as by means of a driver's lever or the like to increase or decrease the value of the resistance by discrete steps, and means responsive to the current supplied by the motor to said resistance are arranged in response to said current reaching a predetermined value to prevent further removal of sections of said resistance. The current responsive means are preferably also arranged so as (when the current reaches a predetermined value) to increase the value of said resistance, that is to say to reinsert sections thereof. By this means the braking torque is under control of the driver so that he can increase or reduce the retardation at will, but the current responsive means operate so as to prevent the driver effecting such reduction of the value of the resistance as will reduce the torque and provide unstable operation whilst the inclusion of means for reinserting the resistance sections will ensure that should conditions be such that after removal of resistance sections the unstable operation would result with continued operation at the prevailing value of resistance then the value of the resistance will be increased independently of any action on the part of the driver.

In carrying out the invention the control means referred to may be effective only during dynamic braking, or may be arranged to be effective to control both dynamic braking and motoring operation, the current values referred to then being the same as or different from one another for braking and motoring.

According to a further feature of the invention the control means are such that removal of the resistance or a part thereof, usually the removal of the lower resistance values, is provided by time delay means automatically according to a predetermined schedule in response to movement of the driver's lever or the like to the maximum position, or to such extent as determined by the extent of movement of the driver's lever. The time delay is sufficiently great that even under the worst conditions of loading the resistance cannot be removed so fast as to introduce unstable operation, that is to say, the time taken to remove the resistance is as great as the time needed for the motor speed to fall over the corresponding speed range, and the current responsive means will then be responsive to reduce the resistance at a greater rate than that determined by the time delay means if the motor speed falls at a higher rate than that above referred to.

As hereinbefore indicated, the invention provides advantageous means of control for equipments employing metallic resistance elements, although the invention is not limited in this respect; such metallic resistance elements may be controlled by a plurality of contactors electromagnetically operated or controlled by master control means operated by the driver's lever or the like whilst the current responsive control means comprise a current limit relay or relays having contacts included in operating or controlling circuits of at least some of said contactors. Current limit relay contacts for removed resistance may then be included in parallel circuits to contacts governed by the time delay means.

Figure 2:
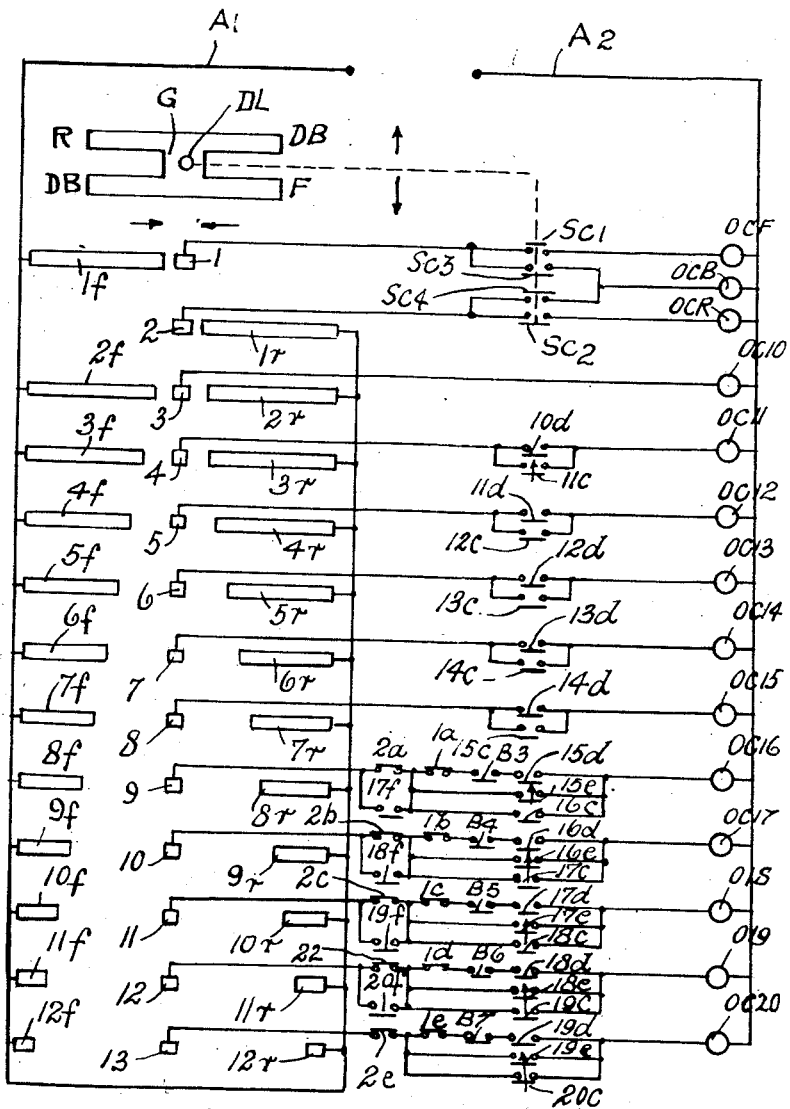

One embodiment of the invention will now be described by way of example with reference to the accompanying drawings, in which:

Fig. 1 is an electrical diagram showing the main power circuits of the induction motor and Fig. 2 is an electrical diagram showing the control circuits.

In Fig. 1 an induction motor M has its stator winding adapted to be connected with three phase supply lines S1, S2 and S3 by means of a forward contactor F or alternatively by means of a reverse contactor R so as to energise the motor for forward and reverse rotation respectively. The stator winding is also adapted to be connected with a source of direct current by closure of a braking contactor B in order to obtain dynamic braking, the contactors F and R being then both open.

The rotor winding of the induction motor is in the example illustrated a three phase winding, the slip rings of which are connected in a closed circuit comprising three sets R1, R2 and R3 of series connected resistance elements connected in star with one another. These resistance elements are arranged to be short circuited in a plurality of steps, for example eleven steps in the arrangement illustrated, by means of double-pole contactors having respectively contacts 10a and 10b, 11a and 11b . . . 20a and 20b. These contactors will hereinafter be referred to as the first to the eleventh resistance contactors respectively.

The control arrangement (Fig. 2) comprises a drum controller MC illustrated in the conventional manner and comprising a plurality of contact fingers 1 to 13 inclusive adapted to be engaged by "forward" contact segments 1f to 12f respectively or alternatively by "reverse"

contact segments 1r to 12r inclusive. The forward and reverse segments are all connected with one supply conductor A1 of an auxiliary control current source, the return conductor being shown at A2. The operating coils of the resistance contactors 10a, 10b to 20a, 20b inclusive are shown in Fig. 2 at OC10 to OC20 inclusive whilst the operating coils of the forward and reverse contactors F and R and of the braking contactor B are shown in Fig. 2 at OCF, OCR and OCB respectively. The controller MC includes also selector contacts SC1, SC2, SC3 and SC4 hereinafter to be described in detail.

The coil OCF is connected in an operating circuit which extends from the conductor A1 through the segment 1f and finger 1, selector contacts SC1 and the coil OCF to the conductor A2. The coil OCR is connected in a circuit which proceeds from conductor A1 through the segment 1r finger 2, selector contacts SC2 and the coil OCR to the conductor A2. The coil OCB is provided with alternative operating circuits, one of which extends from the finger 1 through selector contacts SC3 and the coil OCB to the conductor A2 and the other of which extends from finger 2 by means of selector contacts SC4 and the coil OCB to said conductor A2. These selector contacts are operated by a driver's control lever in a manner which will now be described. The driver's control lever, indicated generally at DL, is movable in the otherwise known H gate, that is to say the lever is angularly movable in a pair of parallel slots indicated at DB—F and R—DB in Fig. 2 and is laterally movable from each slot to the other slot through a gate G at the centres of the slots. In the illustrated central position of the lever DL the contact segments of the drum controller occupy their illustrated "off" positions, whereas movment of the lever in either slot to the position F or the position DB will cause contacts 1f to 12f to engage with the contact fingers 1, 3 ... 13 inclusive and the movement of the lever in either slot to the position R or DB will cause the segments 1r to 12r inclusive to engage in turn with the fingers 2 to 13 inclusive. The selector contacts SC1 to SC4 are arranged to be operated by the lateral movement of the lever DL through the gate G, the contacts SC1 and SC4 being closed when the lever is located in the slot DB—F and the contacts SC2 and SC3 being closed when the lever is located in the slot R—DB.

It will thus be clear that movement of the lever from the gate towards the position F will, by the engagement of segment 1f with finger 1 and closure of contacts SC1, cause closure of the forward contactor F, and the contactors 10 to 20 inclusive will be closed in turn but subject to various auxiliary contacts hereinafter to be described. Movement of the lever in the same slot to the position DB however will, as a result of engagement of contact 1r with finger 2 and closure of contacts SC4 whilst contacts SC2 are open, result in closure of the braking contactor B (Fig. 1) to institute dynamic braking, again with the rotor resistance controllable by closure of contactors 10 to 20 in accordance with the angular position of the lever DL. Movement of the lever DL towards the position R again causes engagement of contact segment 1r with finger 2 but since the selector contacts SC2 are now closed and contacts SC4 opened the coil OCR is energised to close the reverse contactor F and provide for reverse winding under control of the lever DL. Movement of the lever DL towards the position DB causes contact segment 1f to engage contact 1 but the selector contacts SC1 will then be opened and selector contacts SC3 closed so that again the braking contactor B is closed to provide dynamic braking of the driver's lever.

It will be understood that although in the preferred arrangement illustrated the master controller is arranged for operation in accordance with the otherwise known H gate, the system illustrated is applicable by simple modification as will be apparent to those skilled in the art for various other of the known gate arrangements.

The operating circuits for the coils OC10 to OC20 of the resistance contactors include respectively the contact fingers 3 to 13 inclusive so as to provide the progressive removal of rotor resistance during forward and reverse motoring and dynamic braking as above indicated. The operating circuits for the coils OC11 to OC15 inclusive of the second to sixth resistance contactors each include also normally open interlock contacts 10d, 11d, 12d, 13d, and 14d operated respectively by the preceding contactor in the sequence. These interlock contacts ensure that the contactors can only be closed in the predetermined sequence for cutting out the sections of the resistances R1, R2, R3 in turn. The interlock contacts 10d to 14d just above referred to are shunted respectively by holding-in contacts 11c to 15c, inclusive, of the associated contactors, whereby the continued energisation of each of said contactors after closure thereof by the master controller is not dependent on the position of the preceding contactor in the sequence.

The operating circuits for the coils OC16 to OC20 of the seventh to eleventh resistance contactors include in series normally open interlock contacts 15d to 19d corresponding with the contacts 10d to 14d already described each operated by the preceding contactor in the sequence, and further contacts as will first be described for the coil OC16. The operating circuit for this coil proceeds from the contact finger 9 by means of contacts 1a and 2a of first and second current limit relays responsive to the rotor current of the motor. The current limit relays may be alternating current devices but conveniently comprise direct current relays, the operating coils of which, shown at CL2 and CL1 (Fig. 1) are connected by means of a three phase rectifier RX with the secondary windings of current transformer CT included in the slip-ring connections of the motor M. Conveniently the coils CL1 and CL2 may be connected in series with one another as shown in Fig. 1 and shunted by adjustable preset rheostats RM1 and RM2 whereby the settings of the two current limit relays may be adjusted to provide operation as hereinafter described. Reverting to Fig. 2 the circuit for the coil OC16 proceeds through normally open contacts B3 operated by the braking contactor B. Contacts 1a, B3 and 15d are all shunted by holding-in contacts 16c of the contactor 16 and are also shunted by interlock contacts 15e closing with a time delay after closure of the preceding contactor in the sequence, namely the contactor 15. The contacts 2a of the second current limit relay are shunted by normally open contacts 17f operated by the next succeeding contactor, namely the contactor 17 in the sequence.

The circuits for the operating coils OC17 to OC19 similarly include normally closed contacts of the two current limit relays, normally open contacts B4 to B7 of the braking contactor and normally open contacts 16d to 19d inclusive of the preceding contactor in the sequence, the last three mentioned contacts being shunted by two parallel circuits one of which includes holding in contacts 17c to 20c of the associated contactor and the other of which includes normally open contacts 16e to 19e inclusive of the preceding contactor in the sequence. The contacts 2b, 2c and 2d in the operating circuits of the 17th, 18th and 19th resistance contactors are shunted respectively by normally open interlock contacts 18f, 19f and 20f operated by the next succeeding contactor in the sequence.

In the operation of the arrangement shown in Figs. 1 and 2, the driver may operate the drum controller MC to close the contactors 10 to 15 inclusive whereby to remove the first six steps of resistance as rapidly as he desires but thereafter further short circuiting of the resistance is under control not only of the driver's lever but also under control of the current limit relays. The time delay interlock contacts 15e to 19e inclusive provide that if the controller is moved rapidly to the maximum position, namely to the extremity of any slot F, DB, R and DB, that is to say to the position for short circuiting all the rotor resistance then the remaining steps of rotor resistance will not be short circuited immediately, but only in steps with time intervals determined by the time delay in operation of said contacts 15e to 19e inclusive. This time delay is chosen so that the speed of the hoist will fall by such an amount under the worst conditions of loading that the short circuiting of resistances will not increase the rotor current beyond the stable value. As a result of the inclusion of the current limit relay contacts 1a to 1e, in alternative operating circuits to said time delay circuits, contacts 15e to 19e, it is provided, however, that during dynamic breaking should the speed fall more rapidly than the calculated rate just above referered to, then the current limit relay CL1 will cause the resistances to be short circuited more rapidly and so maintain maximum breaking torque.

It will be clear that with the driver's lever in any intermediate position between the sixth and final notches the resistances may be automatically short circuited either under control of the time delay interlock contacts 15e to 19e or under control of the current limit relay CL1 but only up to the notch corresponding with the position of the driver's lever. Furthermore, the driver can at any time reinsert part or all of the rotor resistances at will.

It is possible in the operation of a hoist during braking for the speed to rise so that although at one instant the resistance may be reduced to a given amount such resistance at a later instant will be too low for stable operation. The second current limit relay provides as will now be described for automatic reinserting the rotor resistance under such conditions. Since the second current limit relay CL2 has its contacts 2a to 2e inclusive connected in series in the operating circuits of the seventh to eleventh resistance contactors between the contact fingers 9 to 13 respectively and the time delay contacts 15e to 19e, the various operating and hold-in circuits already described are all controlled by the second current limit relay. The second current limit relay CL2 is adjusted to operate at a value of rotor current slightly below that corresponding to peak torque, for example.

In operation, therefore, when the rotor resistance has been short-circuited up to the seventh or a succeeding notch and the operating conditions then become such that the current rises above, say, the amount associated with peak torque, with the danger of loss of torque, the second current limit relay will operate and prepare circuits for opening contactors 16 to 20 inclusive. The contactors will be de-energised in sequence determined by the interlock contacts 20f to 17f inclusive, in that order, that is to say, they are opened in reverse order to that obtained during the short-circuiting of resistance, and their opening will be controlled by the contacts 2a to 2e of the second current limit relay to reinsert sufficient rotor resistance as to reduce the current to a value giving stable operation. As the hoist thereafter slows down and the rotor current falls the rotor resistance will be reduced as already herein described.

It will be seen that the reinsertion of resistance by the second current limit relay is independent of the position of the driver's lever.

As above described, the time delay contacts 15e to 19e provide for the resistance to be removed at at predetermined rate and this rate is chosen such as to correspond with the rate at which the rotor will slow down under the worst conditions of loading so that each notch of resistance cannot be removed until the speed has fallen to a value such that the rotor current does not exceed the value giving at that speed the maximum torque and so that increase of speed will cause increase of braking torque, such conditions being essential to stable operation. Under more favorable conditions the first current limit relay CL1 provides that the resistance can be removed more rapidly to maintain maximum continuous braking torque. Should conditions arise such that the rotor does not in fact slow down at the predetermined rate, or such that the rotor increases in speed, the increase of rotor current will cause the second current limit relay to operate and reinsert rotor resistance sufficiently to regain stable conditions.

It will be understood that if necessary the current relay instead of operating directly in the operating circuits of the resistance contactors may control said circuits through the intermediary of one or more interposed relays.

In a modification the current limit relays are energised by means of a transductor controlled in accordance with the rotor current.

As above indicated, the contacts B3 . . . B7 operate so that the automatic removal of rotor resistance to maintain the rotor current at the value determined by the setting of the current limit relay CL1, is effective only during braking. On the other hand the reinsertion of rotor resistance when the rotor current rises above the setting of the current limit relay CL2 is effective during motoring as well as during braking, since the contacts 2a . . . 2e of the second current limit relay are not shunted by the time delay contacts 15e . . . 19e or by the hold in contacts 16c . . . 20c.

The arrangement shown in Fig. 2 may be employed for obtaining the described automatic control during motoring as well as during braking by the simple omission of said interlock contacts B3 to B7.

Where it is desired to obtain different controlled values of current during braking and motoring, respectively, then the operating circuits for the current limit relay or relays may include interlock contacts of the forward and reverse contactors and of the braking contactor, arranged to change the setting of the current limit relay or relays, such as by operating on the rheostats RM1 and RM2 of Fig. 1.

What we claim is:

1. An electric motor equipment for driving an electric hoisting apparatus, comprising an induction motor having wound rotor and stator members, switching means having contacts connected with the winding of one of said members, contacts having conductors for connecting them with an alternating current supply, and contacts connected with a source of direct current, said contacts having a first operative condition in which the winding of said one of said members is connected with said conductors and a second operative condition in which said winding is connected with said source of direct current for dynamically braking the rotor member, a loading resistance comprising a plurality of sections and having a circuit for connecting it with the winding of the other of said members, second switching means having contacts connected with said resistance sections and operating means for alternatively connecting in and removing from the loading resistance circuit each of said sections in turn, driver adjustable control means having a control member movable to displace it into different positions from a predetermined position and contacts controlled by said control member, an operating circuit including the contacts controlled by said control member and operable by movement of said control member into respectively different positions to render said second switching means operative to remove sections from the circuit of said loading resistance and thereby reduce the value of said resistance by discrete steps corresponding with respectively different displacements of said control member from said predetermined position, said driver adjustable control means including operating means for said first mentioned switching means for placing the latter in said second condition thereof in response to said displacements of said control member, and current responsive means having an operating element connected in circuit with the motor and having contacts in the operating circuit of said second switching means and operative to prevent operation of said second switching means to reduce the value of said resistance in response to said displacements of said control member when said motor current reaches a predetermined value, and further contacts for said current responsive means included in the operating circuit for said second switching means and operable in response to said motor current exceeding said predetermined value to control said second switching means to insert sections of said loading resistance in the circuit thereof and thereby increase the value of said resistance.

2. An electric motor equipment as defined in claim 1, including time delay means responsive to operation of said driver adjustable control means to reduce the value of said loading resistance to a value dependent on the position of said control member.

3. An electric motor equipment as defined in claim 1, wherein said operating element of said current responsive means is connected in circuit with the winding of said other of said motor members and is response to current supplied by said winding.

4. An electric motor equipment for driving an electric hoisting apparatus, comprising an induction motor having wound rotor and stator members, switching means for connecting the winding of one of said members alternatively with alternating current supply conductors or with a source of direct current for dynamically braking the motor, a variable loading resistance having a circuit for connecting it to the winding of the other of said members and comprising a plurality of resistance sections, a plurality of contactors for removing each of said sections from the circuit of the winding of said other of said members, driver operable control means having a control member movable into different positions and contacts controlled thereby, a control circuit for said contactors of said switching means for connecting the winding of said first mentioned member with said source of direct current, said control circuit including the contacts of said control means and responsive to movement of said control member into different positions to cause operation of said contactors to vary the number of resistance sections in the circuit of the winding of the other of said members to thereby adjust the value of said resistance, means responsive to the motor current supplied by the winding of said other of said members to said loading resistance and including contacts in said control circuit and operative to prevent operation of said contactors to remove sections of said resistance from the circuit of the winding of said other of said members in response to operation of said control means when the motor current exceeds a predetermined value, and further means responsive to said motor current and operable to reinsert sections of said resistance in the circuit of the winding of the other of said members when said motor current exceeds said predetermined value.

5. An electric motor equipment for driving an electric hoisting apparatus, comprising an induction motor having wound rotor and stator members, switching means for connecting the winding of one of said members alternatively with alternating current supply conductors or with a source of direct current for dynamically braking the motor, a variable loading resistance in a circuit for the winding of a second of said members and comprising a plurality of resistance sections, a plurality of contactors for removing each of said sections from the circuit of the winding of said second member, driver operable control means having contacts, a control circuit for said contactors and for said switching means including said contacts of said control means for connecting the winding of said first mentioned member with said source of direct current, said control circuit being responsive to operation of said control means to cause operation of said contactors to vary the number of resistance sections in the circuit of the winding of said second member and thereby vary said resistance, current limit relay means responsive to motor current supplied by the winding of said second member to said loading resistance and including contacts in said control circuit operative to prevent operation of said contactors to remove resistance sections from the circuit of the winding of said second member in response to operation of said control means when said motor current exceeds a predetermined value, and further means responsive to said motor current and operable to reinsert sections of said loading resistance in the circuit of the winding of said second member when said motor current exceeds said predetermined value.

6. An electric motor equipment for driving an electric hoisting apparatus, comprising an induction motor having wound rotor and stator members, switching means for connecting the winding of one of said members alternatively with alternating current supply conductors or with a source of direct current for dynamic braking of the motor, a variable loading resistance for the winding of a second of said members comprising a plurality of resistance sections, a plurality of contactors for removing said sections from the circuit of the winding of said second member to vary the value of said loading resistance, driver operable control means having contacts, a control circuit including said contacts and said contactors and for said switching means to connect the winding of said first mentioned member with said source of direct current, said control circuit being responsive to operation of said control means to cause operation of said contactors to adjust the value of said resistance, current limit relay means responsive to motor current supplied by the winding of said second member to said loading resistance and including contacts in said control circuit adapted to prevent operation of said contactors to remove sections from said resistance responsively to operation of said control means when said motor current exceeds a predetermined value, and a second current limit relay means responsive to the magnitude of current in the loading resistance, said second current limit means having contacts included in said control circuit for causing operation of said contactors to reinsert resistance sections in the loading resistance when said motor current exceeds said predetermined value.

7. An electric motor equipment for driving an electric hoisting apparatus, comprising an induction motor having wound rotor and stator members, switching means for connecting the winding of one of said members alternately with alternating current supply conductors or with a source of direct current for dynamically braking the motor, a variable loading resistance having a circuit connecting it to the winding of a second of said members to receive motor current therefrom and comprising a plurality of resistance sections, a plurality of contactors for varying the number of resistance sections in the circuit of the loading resistance and thereby adjusting the value of said resistance, a control circuit for said contactors, driver operable control means including contacts in said control circuit and operable to cause operation of said contactors to remove sections from the loading resistance and thereby reduce the value of said resistance in response to operation of said control means, current limit relay means responsive to motor current supplied by the winding of said second of said members to the loading resistance and operable to prevent operation of said contactors to remove sections from the loading resistance in response to operation of said control means when said motor current reaches a predetermined value, and a second current limit relay means responsive to the magnitude of current in the loading resistance, said second current limit relay means having contacts included in said control circuit and adapted to cause operation of said contactors to reinsert resistance sections in the loading resistance when said motor current exceeds said predetermined value.

8. An electric motor equipment for driving an electric hoisting apparatus, comprising an induction motor having wound rotor and stator members, switching means for connecting the winding of one of said members alternatively with alternating current supply conductors or with a source of direct current for dynamically braking the motor, a variable loading resistance having a circuit connecting it to the winding of a second of said members to receive motor current therefrom and comprising a plurality of resistance sections, a plurality of contactors for varying the number of resistance sections in the circuit of the loading resistance to thereby vary the value of said resistance, a control circuit for said contactors, driver operable control means including contacts included in said control circuit and operable to cause operation of said contactors to remove sections from the loading resistance in response to operation of said control means, and first and second current limit relays having operating coils, a transductor having said current limit relays connected to the output thereof, a control winding and rectifying means connected for response to said motor current in the loading resistance, said first current limit relay having contacts included in said control circuit and operable to prevent operation of said contactors to remove sections from the loading resistance in response to operation of said control means when said motor current reaches a predetermined value, and said second current limit relay having contacts included in said control circuit and adapted to cause operation of said contactors to reinsert sections in the loading resistance when said motor current exceeds said predetermined value.

References Cited in the file of this patent

UNITED STATES PATENTS

| | | |
|---|---|---|
| 1,060,252 | Hall | Apr. 29, 1913 |
| 2,110,906 | Colbert | Mar. 15, 1938 |
| 2,490,458 | Feldhausen | Dec. 6, 1949 |
| 2,625,672 | Calvert | Jan. 13, 1953 |

FOREIGN PATENTS

| | | |
|---|---|---|
| 11,336 | Great Britain | of 1910 |
| 833,946 | France | Aug. 1, 1938 |